(12) United States Patent
Gerber

(10) Patent No.: US 6,478,364 B2
(45) Date of Patent: Nov. 12, 2002

(54) MOTOR VEHICLE DOOR

(75) Inventor: Harald Gerber, Walheim (DE)

(73) Assignee: Dr. Ing. h.c.F. Porsche Aktiengesellschaft, Weissach (DE)

( * ) Notice: Subject to any disclaimer, the term of this patent is extended or adjusted under 35 U.S.C. 154(b) by 0 days.

(21) Appl. No.: 09/867,757

(22) Filed: May 31, 2001

(65) Prior Publication Data

US 2002/0030383 A1 Mar. 14, 2002

(30) Foreign Application Priority Data

May 31, 2000 (DE) .......................... 100 27 283

(51) Int. Cl.[7] .................................. B60J 5/04
(52) U.S. Cl. ................. 296/146.5; 296/146.6; 49/502
(58) Field of Search .................. 296/146.5, 146.6; 49/502

(56) References Cited

U.S. PATENT DOCUMENTS

| | | | | |
|---|---|---|---|---|
| 4,306,381 A | * | 12/1981 | Presto ................. | 296/146.5 X |
| 4,845,894 A | * | 7/1989 | Herringshaw et al. ... | 296/146.5 X |
| 5,536,060 A | * | 7/1996 | Rashid et al. ......... | 299/146.5 X |
| 5,762,394 A | * | 6/1998 | Salmonowicz et al. .. | 296/146.5 |
| 5,857,732 A | * | 1/1999 | Ritchie .................... | 296/146.5 |
| 5,924,760 A | * | 7/1999 | Krajewski et al. ... | 296/146.5 X |
| 6,176,542 B1 | * | 1/2001 | Gooding et al. ..... | 296/145.5 X |
| 6,231,112 B1 | * | 5/2001 | Fukumoto et al. ........ | 296/146.5 |

FOREIGN PATENT DOCUMENTS

| | | | | |
|---|---|---|---|---|
| DE | 197 28 546 | | 1/1998 | |
| GB | 1197150 | | 7/1970 | |
| JP | 405178092 | * | 7/1993 | 296/146.5 |
| JP | 406080022 | * | 3/1994 | 296/146.5 |
| JP | 406106981 | * | 4/1994 | 296/146.5 |

* cited by examiner

Primary Examiner—Joseph D. Pape
(74) Attorney, Agent, or Firm—Crowell & Moring LLP

(57) ABSTRACT

A motor vehicle door with a lower door element is provided into which an outer window channel reinforcement is integrated. This window channel reinforcement comprises a profiled section and is supported on the interior side on the outside door panel. Additional stiffenings of the profiling are formed by transversely extending indentations in the profilings.

10 Claims, 2 Drawing Sheets

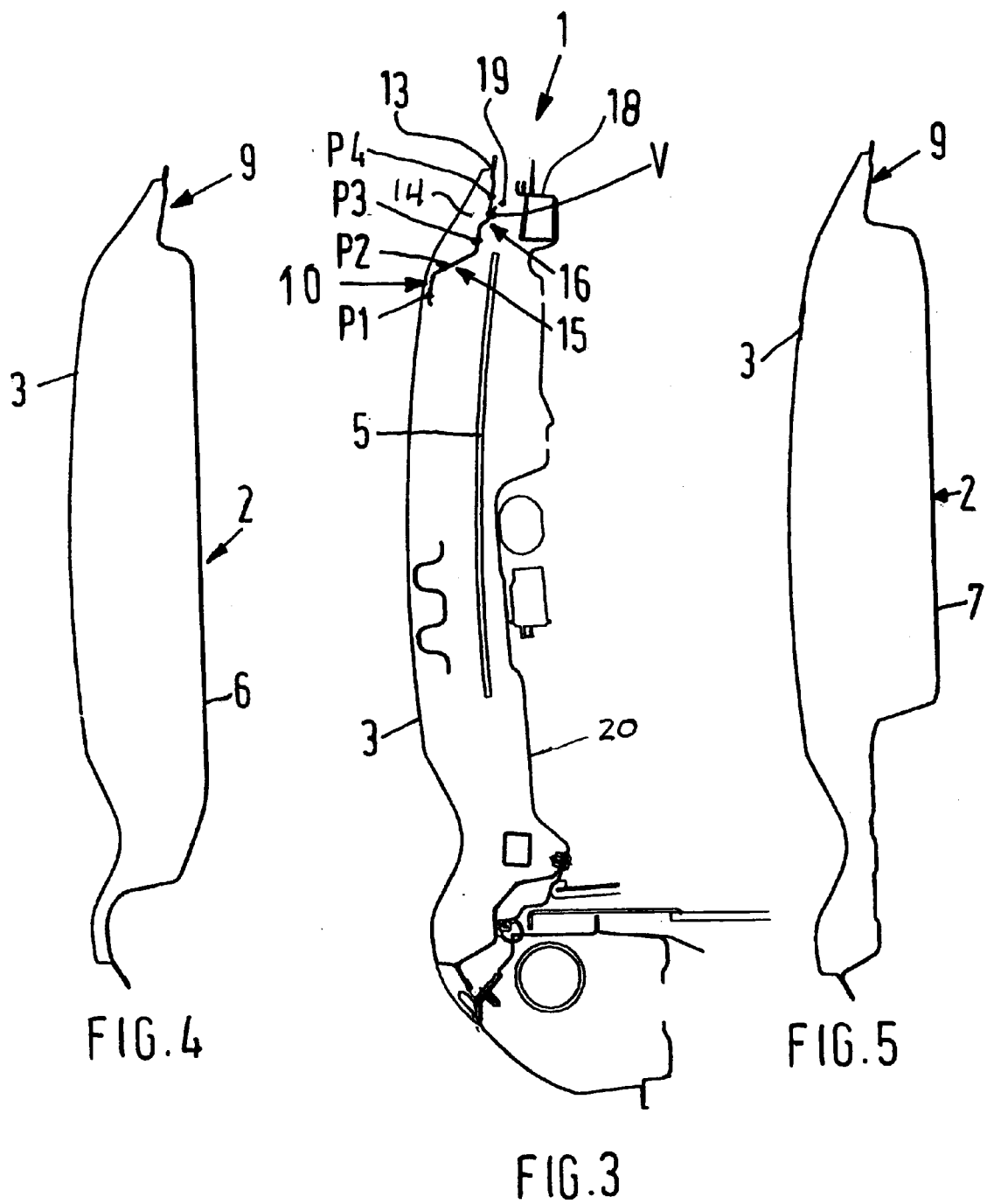

MOTOR VEHICLE DOOR

BACKGROUND AND SUMMARY OF THE INVENTION

This application claims the priority of German Patent Document 100 27 283.5, filed in Germany, May 31, 2000, the disclosure of which is expressly incorporated by reference herein.

The invention relates to a motor vehicle door having a lower door element and a door frame, this door frame having at least one approximately horizontally aligned frame part as an inner window channel reinforcement which extends at the level of the window ledge, and having a lower frame, the area of the door frame situated below the window ledge being provided with a metal support sheet which is connected at least with the frame part of the door frame.

From German Patent Document DE 197 28 546 A1, a frame body for a vehicle door is known which is constructed in several pieces and has reinforcements. Furthermore, from German Patent Document DE 20 23 067 (corresponding GB 1,197,150), an inside door panel is known which extends to the window channel.

It is an object of the invention to provide a vehicle door which has a lower door element for reinforcing a window channel and is easy to mount.

According to certain preferred embodiments of the invention, this object is achieved by way of the lower door element comprising a one-piece supporting frame which is profiled on all sides and has lateral supporting frame profiles and an upper and a lower supporting frame profile and the supporting frame is connected with an outer door panel and with the metal support sheet, and on the upper, approximately horizontally aligned supporting frame profile, an outer window channel reinforcement is integrated which is situated opposite the inner window channel reinforcement. Additional advantageous embodiments are contained in the subclaims.

The principal advantages achieved by certain preferred embodiments of the invention are that an outer window channel reinforcement is integrated into the lower door element and no additional profile reinforcements are required for this purpose. This is achieved in a certain preferred embodiment particularly in that the lower door element consists of a one-piece supporting frame which is profiled on all sides and has lateral profiles and an upper and a lower supporting frame profile. This door element is, on the one hand, connected with the outside door panel and, on the other hand, with a metal support sheet. At the upper, approximately horizontally aligned supporting frame profile, the outer window channel reinforcement is integrated which is situated opposite a frame part of the metal support sheet.

In a certain preferred embodiment, the outer window channel reinforcement is provided in the central unstable area of the upper supporting frame profile of the door element, so that a uniform gap is ensured for the window guide, which is also supported by the inner window channel reinforcement on the frame part.

In another certain preferred embodiment, the profilings of the window channel reinforcement have a relatively large width, and the longitudinally extending, cross-sectionally step-shaped profilings as well as the supporting on the outside door panel increase the stability of the motor vehicle door and simultaneously that of the window channel with respect to buckling. So that a stiffness of the reinforcement is also ensured in the vertical direction, in the longitudinally extending profilings, several indentations are provided which extend transversely thereto, that is, in the vertical direction, and extend through the profilings.

As a result of its one-piece construction, the supporting frame can be connected in a simple manner with the outside door panel as well as with the metal support sheet, so that the door can advantageously be preassembled.

Other objects, advantages and novel features of the present invention will become apparent from the following detailed description of the invention when considered in conjunction with the accompanying drawings.

BRIEF DESCRIPTION OF THE DRAWINGS

FIG. 3 shows a sectional view of the door according to Line III—III of FIG. 1;

FIG. 4 shows a sectional view of the door according to Line IV—IV of FIG. 1; and FIG. 5 shows a sectional view of the door according to Line V—V of FIG. 1.

DETAILED DESCRIPTION OF THE DRAWINGS

Figure 1:
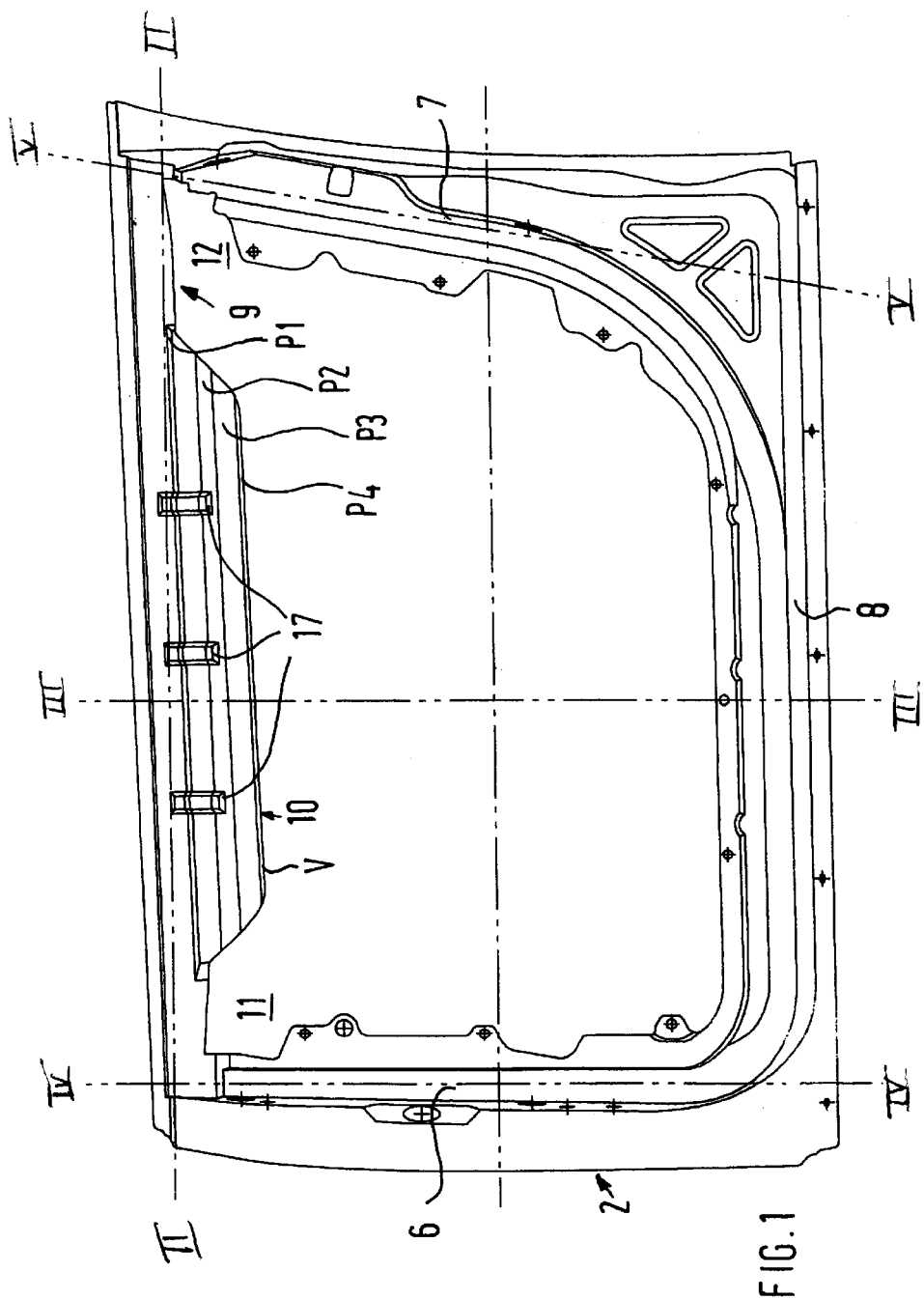
FIG. 1 shows a view of a lower door element from the outside onto a door.
Figure 2:
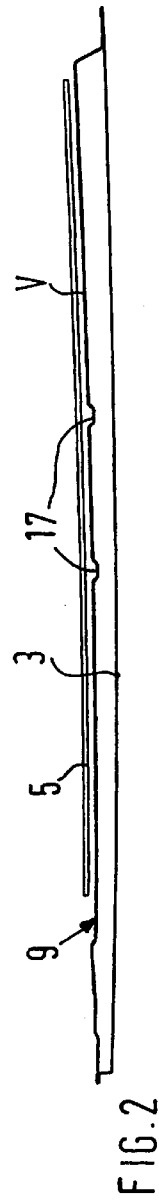
FIG. 2 shows a sectional view of the door according to Line II—II of FIG. 1.

As in FIGS. 1 and 2, a vehicle door 1 comprises basically a lower one-piece door element 2 and an outside door panel 3 connected therewith, a door frame with a metal support sheet 20 as well as a window frame, which is not shown and has a window lifting mechanism for a window 5.

As shown in FIGS. 4 and 5, the lower door element 2 includes basically a supporting frame which is of one piece on all sides and has laterally profiled supporting frame profiles 6, 7 as well as a lower supporting frame profile 8 and an upper supporting frame profile 9 which is constructed as a window channel reinforcement V and is approximately horizontally aligned.

The window channel reinforcement V is integrated in the door element 2 and includes a cross-sectionally step-shaped profile with several profilings P1 to P4 which rests by way of its lower leg 10 on the outside door panel 3. This reinforcement V is arranged approximately in the center of the door element 2 or of the supporting frame profile 9 and has one free cut 11 and 12 respectively with respect to the lateral supporting frame profiles 6 and 7.

Between the lower leg 10 of the reinforcement V and its upper end edge 13, a hollow space 14 is provided between the outside door panel 3 and the reinforcement V. An upper leg of one of the profilings is surrounded by a groove of the outer door panel and is otherwise arranged in an exposed manner while forming the hollow space to the outside door panel.

From the lower leg 10, the reinforcement V extends by way of a diagonal section 15 into an approximately vertical section 16. In this vertical section 16, indentations 17 are provided which extend transversely to the profilings P1 to P4 of the reinforcement V in the vertical direction.

In FIG. 3, the reinforcement 9 has an approximately trapezoidal construction and is situated opposite a frame part or profile 18 as an inner window channel reinforcement which is connected with the metal support sheet 20 so that the gap 19 between the reinforcement V and the profile 18 for the window 5 has a stable construction on the inside and the outside.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motor vehicle door having a lower door element and a door frame, the door frame having at least one approximately horizontally aligned frame part as an inner window channel reinforcement which extends at a level of a window ledge, wherein an area of the door frame situated below the window ledge is provided with a metal support sheet which is connected at least with the frame part of the door frame, and wherein the lower door element comprises a one-piece supporting frame which is profiled on all sides and has lateral supporting frame profiles and an upper and a lower supporting frame profile and the supporting frame is connected with an outer door panel and with the metal support sheet, and on the upper, approximately horizontally aligned, supporting frame profile, an outer window channel reinforcement is integral with the one-piece supporting frame and is situated opposite an inner window channel reinforcement.

2. Motor vehicle door according to claim 1, wherein the outer window channel reinforcement is situated approximately in the center of the upper supporting frame profile and has free cuts toward the lateral supporting frame profiles.

3. Motor vehicle door according to claim 1, wherein the outer window channel reinforcement is provided with cross-sectionally step-shaped profilings and a leg of one of the profilings rests against the outer door panel, and an upper leg of another one of the profilings is surrounded by a groove of the outer door panel and is otherwise arranged in a separated manner to the outside door panel while forming a hollow space.

4. Motor vehicle door according to claim 2, wherein the outer window channel reinforcement is provided with cross-sectionally step-shaped profilings and a leg of one of the profilings restes against the outer door panel, and an upper leg of another one of the profilings is surrounded by a groove of the outer door panel and is otherwise arranged in a separated manner to the outside door panel while forming a hollow space.

5. Motor vehicle door according to claim 3, wherein in the step-shaped profilings of the outer window channel reinforcement, several indentations are provided which extend transversely to the profilings and are arranged at a distance from one another.

6. Motor vehicle door according to claim 4, wherein in the step-shaped profilings of the window channel reinforcement, several indentations are provided which extend transversely to the profilings and are arranged at a distance from one another.

7. A lower door element of a motor vehicle door having a door frame comprising:

a one-piece supporting frame which has lateral supporting frame profiles and an upper supporting frame profile and a lower supporting frame profile, wherein the supporting frame is operatively connected with an outer door panel and a metal support sheet of the door frame, and on the upper supporting frame profile, which is approximately horizontally aligned, an outer window channel reinforcement is integral with the one-piece supporting frame and is situated opposite an inner window channel reinforcement of the door frame.

8. A method of making a motor vehicle door comprising:

providing a door frame having at least one approximately horizontally aligned frame part as an inner window channel reinforcement which extends at a level of a window ledge, providing an area of the door frame situated below the window ledge with a metal support sheet which is connected at least with the frame part of the door frame, providing a lower door element having a one-piece supporting frame which is profiled on all sides and has lateral supporting frame profiles, an upper supporting frame profile and a lower supporting frame profile, connecting the supporting frame to an outer door panel and to the metal support sheet, and integrating on the upper supporting frame profile, which is approximately horizontally aligned, an outer window channel reinforcement, as one piece with the supporting frame, which is situated opposite the inner window channel reinforcement.

9. A method according to claim 8, wherein the outer window channel reinforcement is provided with cross-sectionally step-shaped profilings and a leg of one of the profilings rests against the outer door panel, and an upper leg of another one of the profilings is surrounded by a groove of the outer door panel and is otherwise arranged in a separated manner to the outside door panel while forming a hollow space.

10. A method according to claim 9, wherein in the step-shaped profilings of the window channel reinforcement, several indentations are provided which extend transversely to the profilings and are arranged at a distance from one another.

* * * * *